Patented Oct. 4, 1938

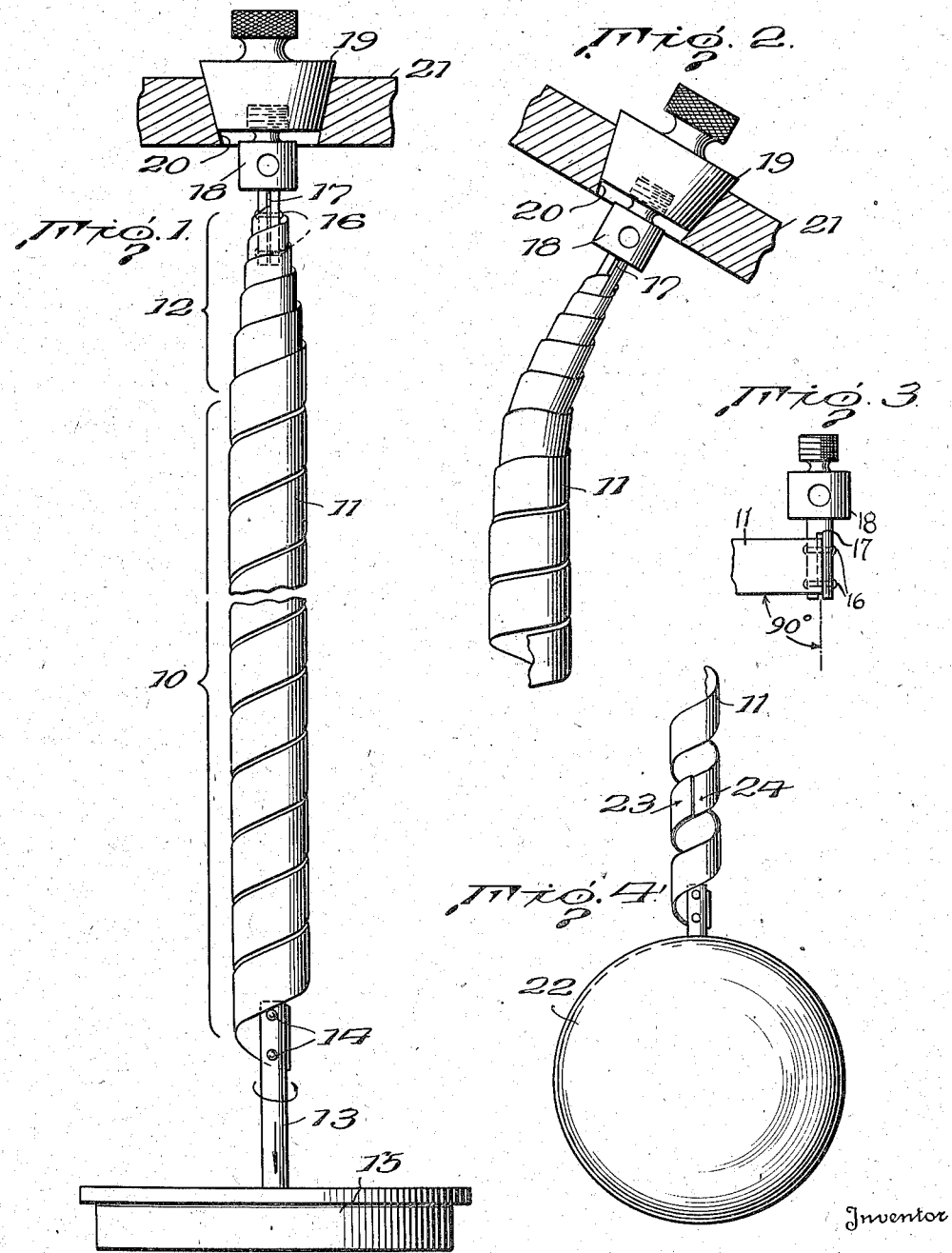
Oct. 4, 1938. A. HOYT 2,131,739
HELICAL RIBBON SPRING MEASURING APPARATUS
Filed Dec. 30, 1936

2,131,739

UNITED STATES PATENT OFFICE 2,131,739

HELICAL RIBBON SPRING MEASURING APPARATUS

Archer Hoyt, Aspinwall, Pa., assignor to Gulf Research & Development Company, Pittsburgh, Pa., a corporation of Delaware Application December 30, 1936, Serial No. 118,411

5 Claims. (Cl. 265—1.4)

This invention relates to improvements in helical ribbon spring measuring apparatus; and it comprises, in apparatus for measuring stresses, a helical coil spring formed of a wound-up thin ribbon, means for applying stress along the axis of the spring, whereby a rotational deflection of the spring proportional to such stress is produced, a portion of the helix adjacent one end thereof being tapered down to form a portion of reduced diameter, and means for supporting the spring attached to the end of the ribbon at said tapered portion, whereby accurate measurement is secured even though the support be incorrectly leveled or misaligned; all as more fully hereinafter set forth and as claimed.

In a prior application, Serial No. 34,824, filed August 5, 1935 I have disclosed a gravimeter of the spring balance type, comprising a mass suspended by a ribbon type coil spring. A coil spring formed of a wound-up thin ribbon of steel or other elastic material has the property of giving, on being subjected to axial stress, an angular deflection. The angular deflection is very nearly linearly proportional to the applied axial stress and may be taken as a measure of the stress. In the principal embodiment of the gravimeter disclosed in said application, the mass is suspended by means of the ribbon spring, the upper end of the spring being secured to a fixed support. A gravimeter is required to measure exceedingly small differences in gravity; differences of the order of one part in ten million. Thus anything that tends to introduce a spurious angular deflection of the spring detracts from the accuracy of the instrument. One source of error is the effect of improperly leveling the instrument. If the ribbon spring be rigidly attached to the support, the sensitivity to leveling errors is sometimes as high as 1 milligal per 10 seconds of arc off level. (1 milligal is defined as an acceleration equal to 0.001 cm. per second$^2$.) That is to say, if the instrument be 10 seconds off level, the spurious deflection introduced may be equivalent to a deflection produced by a 1 milligal change in the acceleration of gravity ($g$). With an accuracy requirement of 0.1 milligal a simple instrument must be leveled to within one second of arc. This is difficult of accomplishment in the field, especially if the ground is soft or swampy. In the application there was disclosed a way of reducing the level sensitivity, by providing a filamentary suspension or a flexible adjusting means for suspending the spring. This lessens the precision required in leveling.

According to the present invention I provide a construction adapted to further reduce the level sensitivity of instruments having helical ribbon springs, without introducing complications, and with a considerable gain in ruggedness. According to the invention the upper portion of the spring is tapered down to a small diameter. That is, the uppermost few turns are gradually diminished in radius. The tapered end of the spring is rigidly attached to the support. By this expedient, the level sensitivity of the apparatus is reduced by a factor of 10 to 20, so that the precision of leveling required for a tolerance of 0.1 milligal is 10 to 20 seconds of arc. This improvement greatly facilitates field operations and moreover provides an instrument which is especially rugged, by reason of the rigid attachment of spring to support.

In the accompanying drawing I have shown more or less diagrammatically, two examples of a specific embodiment of the invention. In the showings, Fig. 1 is a view in elevation of a spring according to the invention with associated parts making up a gravimeter;

Fig. 2 shows what takes place in the apparatus of Fig. 1 when the support is off level;

Fig. 3 is a detailed view showing one manner of attaching the spring to the support; and Fig. 4 illustrates the adaptation of the invention to a barometer.

In the drawing, Fig. 1 shows the essential parts of a spring gravimeter embodying the invention. The spring comprises a helical portion 10 formed by winding up a thin ribbon 11 into the form shown; and an upper tapered portion 12 merging with the cylindrical portion. The lower end of the spring is attached to a post 13 as by rivets 14 and an annular mass 15 is attached to the post. The mass hangs freely and is suspended by the spring. As shown, the tapered end of the spring is attached as by rivets 16 in a slot 17 of a threaded fixture 18 carried in an adjusting plug 19 seated in a conical seat 20 of a fixed support 21. Other means for attaching the spring to the fixture can be used, e. g. soldering; the spring in all cases being rigidly attached to the supporting fixture, so as to form a unit therewith.

In operation, at a given location on the earth the spring and weight assume a definite position such as that shown in Fig. 1. Upon taking the instrument to a region of different gravity, the mass suffers a change in weight, thereby changing the stress on the spring. This results in an angular deflection of the spring, the maximum deflection being at the lower end thereof. This angular deflection is measured by suitable means (not shown) and is taken as a measure of the change of gravity.

Ordinarily, the tapering is applied to 5 to 10 turns of the helix and the tapered portion extends approximately one-tenth the length of the spring.

Fig. 2 shows in exaggerated manner what takes place when the support is not accurately leveled. The tapered portion of the spring is deflected but the main helical portion hangs vertical.

The success of the invention depends upon the facts that any bending of the ribbon spring is transformed into a rotation of the weight about the spring helix axis and that any spurious deflection arising from the bending due to improper leveling depends on the length of the ribbon thereby stressed. Thus reducing the length of ribbon subjected to stress by bending errors, correspondingly reduces the spurious rotation. And since 5 to 10 tapered turns of helix contain less length of ribbon than an equal number of turns of the cylindrical portion of the helix the desired end is attained. Another factor is that the bending moment is proportional to the helix radius and therefore tapering the top portion of the spring reduces the bending moment tending to distort the spring. These effects combine to reduce the sensitivity of the instrument to leveling errors. The mechanics of ribbon springs is complex, and it is probable that other more complicated factors also enter in; but in any case tapering the spring as described results, as a matter of fact, in a substantial decrease of level sensitivity.

It will be noted that the spring is rigidly attached to the support. This is of great advantage in that it provides the strongest possible attachment of the spring to the frame. The instrument withstands very rough handling; transportation in trucks, etc.

It has been found that the best results are secured if the upper end of the spring leaves the supporting fixture of pin substantially horizontally, i. e. at right angles to the axis of the pin (or of the helix). Fig. 3 shows this arrangement, the ribbon being shown for the sake of clarity as pulled out flat. To secure the best results the ribbon should leave the pin at an angle not departing more than about 5 degrees from a right angle.

In producing the spring, a pre-formed helical ribbon is attached to the pin and the taper is introduced with the fingers, at first with no load on the spring and later with a part of the ultimate load. The tapered portion is usually formed as a substantially conical helix. The finishd spring is heat treated prior to use. The spring is usually embodied in metal or metal alloys.

While the invention has been described in reference to a gravimeter, it is applicable to other instruments using a helical spring for measuring stress. For example, the spring may be arranged in a barometer, by substituting for the annular mass 15 a thin-walled partially evacuated float of glass or the like, as shown at 22 in Fig. 4. Upon change in atmospheric pressure the spring is angularly deflected in a manner similar to that described in connection with Fig. 1, and the deflection is measured by suitable means (not shown). The top portion of the spring is tapered as in Fig. 1 and prevents spurious readings due to improper leveling. A barometer embodying a helical ribbon spring is disclosed in my copending application Serial No. 71,747, filed March 30, 1936.

If desired, a portion of the helix, e. g. one or two turns, can be made bimetallic, to compensate for temperature changes (which tend to cause a spurious angular deflection of the spring). In Fig. 4 the lower portion of the helix is shown as comprising two ribbons of different metals, indicating at 23 and 24, soldered or otherwise fastened to each other. Temperature compensation can be effected in other ways. For example, a separate short temperature compensating unit can be mounted in series with the ribbon spring, as disclosed in my acknowledged copending applications, the compensating unit being made stiff elastically so as not to enter into the action of the system in any way other than thermally.

What I claim is:—

1. In measuring apparatus, a helical coil spring formed of a wound-up thin ribbon, means for applying stress to one end of the spring axially of the helix so that such stress causes an angular deflection of the spring, the other end of the helix being tapered down to form a portion of diminished diameter, and means rigidly attached to the end of the ribbon at said tapered portion for supporting the spring, the tapered portion preventing spurious rotations, due to improper alinement of the supporting means with respect to the helix axis, from being communicated to the other end of the spring.

2. The apparatus of claim 1 wherein the axis of the ribbon at the end attached to the supporting means is substantially at right angles to the helix axis.

3. The apparatus of claim 1 wherein the tapered portion comprises from 5 to 10 turns of the helix and extends over approximately one-tenth of the length of the helix.

4. In measuring apparatus, a vertically arranged helical coil spring formed of a wound-up thin ribbon, a massy body attached to the lower end of the spring and supported thereby, the upper end of the helix being tapered down to a portion of small diameter, and supporting means for the spring rigidly attached to the end of the ribbon at the tapered portion, the tapered portion preventing inaccuracies in leveling of the supporting means from being communicated to the lower end of the spring.

5. In measuring apparatus, a helical coil spring formed of a wound-up thin ribbon, means for applying stress to the spring axially of the helix so that such stress causes an angular deflection of the spring, a major portion of the spring consisting of a cylindrical helix and a minor portion of the spring consisting of a helix of smaller diameter having a substantially conical taper toward the end of the spring, and means rigidly attached to the end of the tapered portion for supporting the spring, the tapered portion preventing spurious rotations due to improper alinement of the supporting means with respect to the helix axis, from being imparted to the end of the spring opposite the attached end.

ARCHER HOYT.